F. W. WILLIAMSON.
DISPENSING APPARATUS.
APPLICATION FILED NOV. 14, 1907.

928,230.

Patented July 13, 1909.
2 SHEETS—SHEET 1.

Witnesses:

Inventor:
Frank W. Williamson,
By Whitler, Flanders, Bottum & Jewett
Attorneys.

F. W. WILLIAMSON.
DISPENSING APPARATUS.
APPLICATION FILED NOV. 14, 1907.
928,230.
Patented July 13, 1909.
2 SHEETS—SHEET 2.
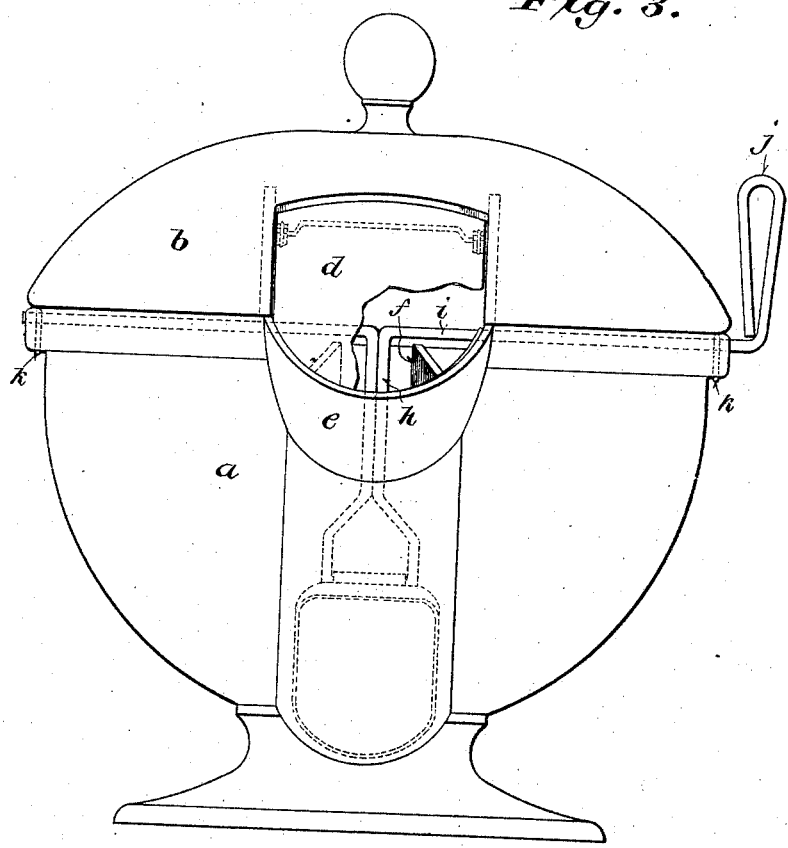
Fig. 3.
Fig. 4.
Witnesses:
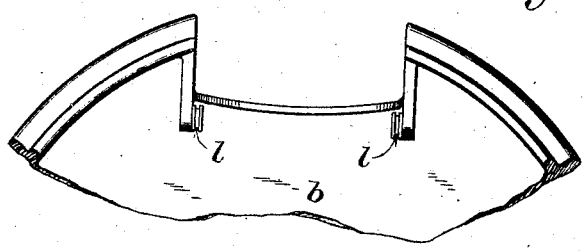
Inventor:

UNITED STATES PATENT OFFICE.

FRANK W. WILLIAMSON, OF CHICAGO, ILLINOIS, ASSIGNOR TO MARY P. WILLIAMSON, OF CHICAGO, ILLINOIS.

DISPENSING APPARATUS.

No. 928,230.　　　Specification of Letters Patent.　　　Patented July 13, 1909.

Application filed November 14, 1907. Serial No. 402,105.

*To all whom it may concern:*

Be it known that I, FRANK W. WILLIAMSON, a citizen of the United States, residing at Chicago, in the county of Cook and State of Illinois, have invented certain new and useful Improvements in Dispensing Apparatus, of which the following is a specification, reference being had to the accompanying drawing, forming a part thereof.

This invention relates to receptacles such as bowls from which crushed fruits, syrups and the like are served in connection with soda fountains or otherwise. Its main objects are to facilitate the delivery of measured quantities or the desired portions of fruit, syrup or the like from such receptacles without removing their covers, thereby preventing dust, flies, etc. from getting into the receptacles; to stir and keep the contents of the receptacles well mixed without opening them; and generally to improve and increase the convenience and utility of devices of this class.

It consists in certain novel features of construction and in the peculiar arrangement and combinations of parts as hereinafter particularly described and pointed out in the claims.

In the accompanying drawing like characters designate the same parts in the several figures.

Figure 1:
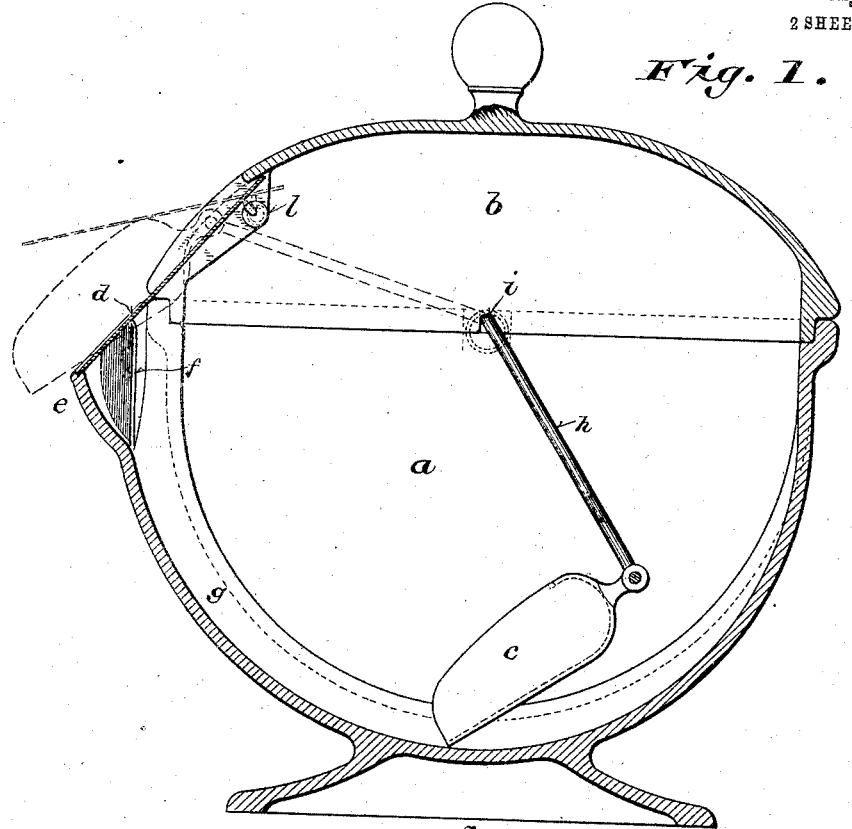
Figure 2:
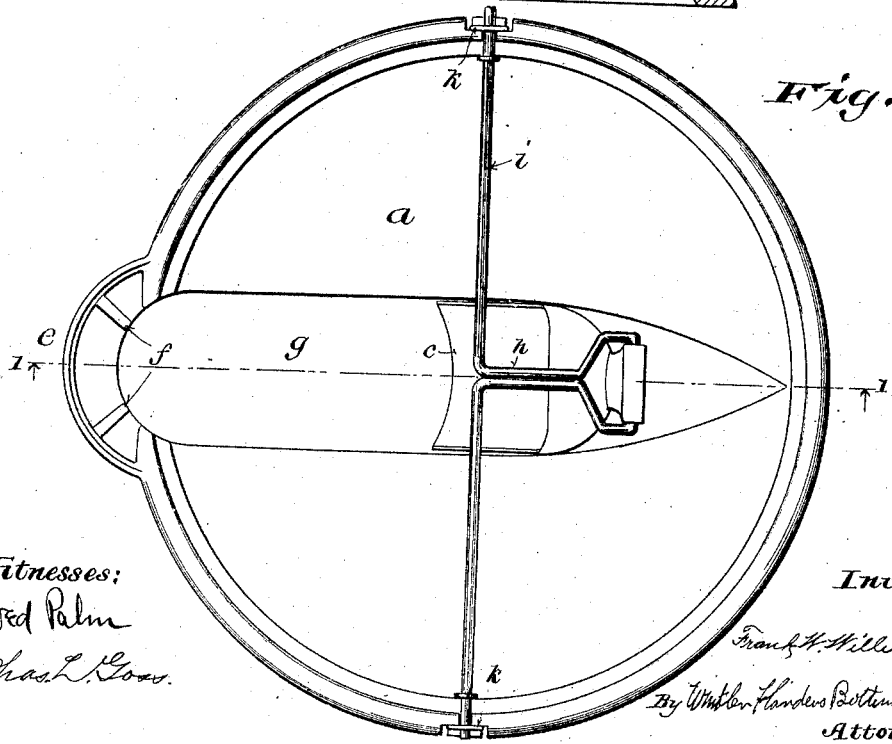

Figure 1 is a vertical medial section on the line 1 1, Fig. 2, of one of various forms in which the invention may be embodied; and Fig. 2 is a plan view of the device, the cover being removed; Fig. 3 is a front elevation of the same as viewed from the left with reference to Figs. 1 and 2; and Fig. 4 is an inverted plan view of a portion of the cover.

The apparatus comprises a bowl or receptacle $a$, usually provided with a removable cover $b$, a scoop or dipper $c$, means for operating the scoop or dipper from the outside to take up and discharge from the bowl or receptacle portions of its contents without removing the cover, and a self-closing lid $d$ adapted to be opened by the operator of the scoop or dipper.

The bowl $a$ may be made of any desired size and shape and of any suitable material, according to the use that is to be made of it. It is formed with a discharge spout $e$, having inwardly projecting wings or guides $f$, over which the scoop or dipper $c$ is elevated into discharging position, as indicated by dotted lines in Fig. 1. In line with the spout $e$ and the inner edges of the wings or guides $f$, the bowl is preferably formed with a channel $g$ in which the free open end of the scoop or dipper $c$ fits and is guided.

Various means may be provided for carrying the scoop or dipper in the bowl and for operating it from the outside without removing the cover. As suitable for this purpose with a bowl of the shape shown, which is particularly designed for use in connection with soda fountains for holding and dispensing crushed fruits, syrups and the like, the scoop or dipper $c$ is pivotally connected adjacent to its closed end with a swinging arm $h$ on a rocker shaft $i$ having bearings in the rim of the bowl on opposite sides thereof, and provided at one end with a crank arm or handle $j$, as shown in Fig. 3. The arm $h$, shaft $i$ and handle $j$ may be conveniently formed of heavy wire in a single piece, as shown. The shaft $i$ may be held in place in its bearings by split wire rings or loops $k$, sprung or bent into grooves in lugs formed on the bowl around said bearings.

The cover $b$ is formed on one side with an opening adjacent to and corresponding in width with the spout $e$, and in this opening is pivoted adjacent to its upper edge the lid $d$, which normally closes said opening and the discharge spout $e$, as shown by full lines in Fig. 1. This lid may be pivoted as shown, by a cross rod or wire attached thereto, in lugs $l$ formed on the cover, the ends of the rod or wire being held in the lugs by wire rings sprung or bent into grooves in the lugs similar to those which hold the shaft $i$ in its bearings in the bowl.

In the present case the bowl and its cover are supposed to be made of glass, porcelain or similar material, while the scoop or dipper and the self-closing lid over the discharge spout are made of metal, although as hereinbefore stated, the various parts of the apparatus may be made of any suitable materials.

In the operation of the apparatus, the bowl or receptacle $a$ being filled or supplied with crushed fruit, syrup or the like, and the cover $b$ placed thereon, a measured quantity or portion of the contents of the bowl is delivered therefrom without removing the cover by turning the crank arm or handle $j$ backward and downward from the position in which it is shown in Fig. 3, thereby carrying the scoop or dipper c up through the channel g and over the wings or guides f into the position indicated by dotted lines in Fig. 1. As it is brought into this position in which it will discharge its contents into a glass held below the spout e, it turns the lid d upward into the position indicated by dotted lines in the same figure. After discharging its contents into the glass, the scoop or dipper is withdrawn into the bowl by turning the handle j back to its original position. In riding over the upper edges of the wings or guides f the bottom of the scoop or dipper c is lifted and held out of contact with the upper edge of the spout e, thereby preventing the fruit, syrup or the like adhering to the outside scoop or dipper from being scraped therefrom by the spout and running down on the outside of the bowl. Upon the withdrawal of the scoop or dipper into the bowl, the lid d swings back into place, completely closing the discharge aperture, thereby effectively excluding dust, dirt, flies, etc. The movement of the scoop or dipper in the operation of the apparatus agitates the contents of the bowl and keeps it well mixed and in proper condition for use.

Various changes in the form, construction and arrangement of parts of the apparatus may be made without materially affecting its mode of operation and without departing from the principle and intended scope of the invention.

I claim:

1. In dispensing apparatus, the combination of a receptacle having a discharge opening, a self-closing lid for said opening, a scoop or dipper movably mounted in said receptacle independently of said lid and adapted when elevated to open said lid and deliver portions of the contents of the receptacle through said opening, and an outside connection for operating said scoop or dipper, substantially as described.

2. In dispensing apparatus, the combination of a receptacle having a discharge opening in the upper part thereof, a scoop or dipper, a movable member carrying said scoop or dipper within said receptacle and having an external operating part and a separate independently movable lid normally closing said opening and adapted to be opened by thrusting the scoop or dipper through said opening, substantially as described.

3. In dispensing apparatus, the combination of a receptacle provided with a removable cover and a discharge opening, a scoop or dipper, a movable member connected with said scoop or dipper within said receptacle and having an operating connection outside thereof, and a pivoted lid normally closing said opening and adapted to be opened by the projection of the scoop or dipper therefrom, substantially as described.

4. In dispensing apparatus, the combination of a receptacle having a discharge spout on one side with a wing or guide projecting inwardly and upwardly therefrom, a scoop or dipper movable up and down within said receptacle to and from said spout over said wing or guide, and means for operating said scoop or dipper outside of said receptacle, substantially as described.

5. In dispensing apparatus, the combination of a receptacle having a discharge opening in the upper part and on one side, a vertically movable member within said receptacle having an outside operating connection, a scoop or dipper pivoted to said member and guided by said receptacle to and from said opening, and an independently mounted and movable self-closing lid for said opening adapted to be opened by the projection of the scoop or dipper therefrom, substantially as described.

6. In dispensing apparatus the combination of a receptacle having a discharge opening and spout on one side with a wing or guide projecting inwardly and upwardly from the rim of the spout, a vertically movable member within said receptacle having an outside operating connection, a scoop or dipper pivoted to said member and movable therewith up and down over said wing or guide into and out of discharging position in said opening, and a self-closing lid for said opening adapted to be opened by the movement of said scoop or dipper into discharging position, substantially as described.

7. In dispensing apparatus, the combination of a receptacle having a discharge opening, a vertically swinging arm within said receptacle having an outside operating connection, a scoop or dipper pivoted to the lower end of said arm and guided in said receptacle to and from said opening, and a self-closing lid for said opening adapted to be opened by the upward movement of said scoop or dipper into said opening, substantially as described.

8. In dispensing apparatus, the combination of a receptacle having a discharge opening, a horizontal rocker shaft having an external operating handle, and a vertically swinging arm within said receptacle, a scoop or dipper pivoted to said arm and guided in said receptacle to and from said opening, and a self-closing lid for said opening adapted to be opened by the movement of said scoop or dipper into said opening, substantially as described.

In witness whereof I hereto affix my signature in presence of two witnesses.

FRANK W. WILLIAMSON.

Witnesses:
EDMUND S. CARR,
P. H. EARLY.